UNITED STATES PATENT OFFICE.

CHARLES E. SKINNER, OF WILKINSBURG, PENNSYLVANIA, ASSIGNOR TO WESTINGHOUSE ELECTRIC & MANUFACTURING COMPANY, A CORPORATION OF PENNSYLVANIA.

PLASTIC COMPOSITION AND PROCESS OF MAKING THE SAME.

1,299,798.  Specification of Letters Patent.  Patented Apr. 8, 1919.

No Drawing. Application filed June 8, 1917. Serial No. 173,478.

*To all whom it may concern:*

Be it known that I, CHARLES E. SKINNER, a citizen of the United States, and a resident of Wilkinsburg, in the county of Allegheny and State of Pennsylvania, have invented a new and useful Improvement in Plastic Compositions and Processes of Making the Same, of which the following is a specification.

My invention relates to plastic compositions and it has for one of its objects to provide a molding material which shall be composed of inexpensive ingredients and from which durable and heat-resistant molded objects may be easily and quickly formed. Another object of my invention is to provide a process of preparing molded and impregnated cement articles whereby an impregnating agent may be thoroughly incorporated in the cement mixture, preparatory to molding, without impairing the setting properties of the cement.

The composition to which my present invention relates is composed, in general, of an inorganic cement such as Portland cement, a fibrous binder such as asbestos and a resinous ingredient such as the resins obtained in coal-tar distillation and consisting mainly of cumaron, indene and their isomers, particularly paracumaron and paraindene. Suitable inert fillers such as barytes may be added to the three essential ingredients mentioned, and the specific ingredients, as well as their proportions, may be widely varied in accordance with the requirements of special cases. In fact, any fusible moisture proofing material capable of being reduced to a powder will be satisfactory.

Many attempts have been made to produce waterproof cement compositions by the addition of oily substances to Portland cement, but such additions have not been satisfactory as a rule because the presence of oily material in a cement mixture very seriously retards the setting of the cement and weakens the product. One of the functions of the resinous ingredient in my molding compositions is to render the final product waterproof to a greater or less degree, and I prevent the resin from acting upon the cement to retard its setting in the manner of an oily waterproofing agent by mixing the resin with the cement in unfused and powdered condition, the resinous material acting simply as a filler until the cement is set. The material is then heated to a temperature above the fusing point of the resin whereby the resin melts and thoroughly permeates the mixture.

The resinous ingredient of my molding mixtures may be present in widely varying proportions. When it is desired to produce a mixture having maximum resistance to moisture, the resin may constitute 20% or more of the mixture, while if it is desired to produce a mixture which is highly resistant to heat but which need not be particularly resistant to moisture, the proportion of the resin may be reduced to as little as 5% or even less. The cement ingredient may constitute about 40 to 45% of the mixture, the asbestos or other fibrous filler from 30 to 40% and the inert powdered filler, if present at all, may be added in quantities up to 10 or 15%. A suitable molding mixture having high resistance to moisture may consist of the following ingredients, in substantially the proportions indicated:

Cumaron resin _____ 20%
Portland cement_____ 40%
Asbestos _____ 30%
Barytes _____ 10%

Another mixture, which is highly resistant to heat, may consist of the following ingredients:

Cumaron resin _____ 5%
Portland cement_____ 45%
Asbestos _____ 40%
Barytes _____ 10%

These examples are to be understood as being merely illustrative of my invention, since the proportions and materials are capable of wide variations. The resins, cement and filler are mixed, in the form of fine powders, with the asbestos fibers, and sufficient water is added to produce a molding mixture of the proper consistency. The material is then molded into any desired shape without the application of heat and it is permitted to set, suitably by immersing the molded articles in cold water for several days. Articles of this material will set, however, in fairly warm water or in a steam vapor oven. Under these conditions, the cement sets in about the same manner as when no resin is present, the resin acting for the time as a filler, so far as the setting of the cement is concerned. The articles are then heated to about 250° C., when the resin fuses and renders the articles substantially impervious to moisture.

Molding mixtures prepared in the manner described above may be substituted in many cases for hot molding materials, with a consequent saving in the cost of production, since cold molding operations are much less expensive than hot molding operations.

The materials herein described may be utilized for making many kinds of molded articles where mechanical strength, toughness and resistance to shock, moisture and heat are desirable properties. In the electrical arts, for example, these materials are well adapted to the manufacture of resistance blocks, face plates for resistance frames and all sorts of heat-resisting plates as well as to the manufacture of cap and cone insulators for trolley lines and other forms of insulators. The materials made according to my process are somewhat similar in their composition and characteristics to the composite material commercially known as ebony asbestos lumber, but are mechanically stronger than the asbestos lumber.

In the subjoined claims, the term "cumaron resin" is intended to be a generic term covering the resins which are obtained in the distillation of coal tar and which contain at least one of a group of substances including cumaron, indene, paracumaron, paraindene and the other isomers of cumaron and indene. It is to be understood that my invention is not limited to the use of these specific resins, since coal tar pitch and varnish resins may be substituted for them if desired. Cumaron resins, however, are inexpensive and well adapted to my purpose and I therefore prefer at present to make use of these resins in preparing my molding mixtures. In view of the wide variations of which my invention is capable, I desire that no limitations shall be imposed thereon except such as are indicated in the appended claims.

I claim as my invention:

1. A composition suitable for molding and comprising a cement, a finely divided resinous material and a fibrous material.

2. A composition suitable for molding and comprising an inorganic cement and a resinous material containing a cumaron resin.

3. A composition suitable for molding and comprising Portland cement and a resinous material containing a cumaron resin.

4. A composition suitable for molding and capable of being mixed cold and dry comprising an inorganic cement, a resinous material and a fibrous material.

5. A composition suitable for molding and capable of being mixed cold and dry comprising Portland cement, a resinous material and a fibrous material.

6. A composition suitable for molding and comprising Portland cement, a resinous material containing a cumaron resin, and a fibrous material.

7. A composition suitable for molding and capable of being mixed cold and dry comprising an inorganic cement, a resinous material and asbestos.

8. A composition suitable for molding and capable of being mixed cold and dry comprising Portland cement, a resinous material and asbestos.

9. A composition suitable for molding and comprising Portland cement, a resinous material containing a cumaron resin, and asbestos.

10. A composition suitable for molding and comprising Portland cement, a resinous material containing a cumaron resin, asbestos and an inert filler.

11. A composition suitable for molding and comprising Portland cement, a resinous material containing a cumaron resin, asbestos and barytes.

12. A plastic composition containing the following ingredients in substantially the proportions indicated:

Portland cement_____ 40 to 45 parts.
Resinous material containing
  a cumaron resin_____ 5 to 20 parts.
Asbestos_____ 30 to 40 parts.
Inert filler_____ 10 parts.

13. The method of preparing impregnated articles that comprises mixing a dry cementitious material and a dry fusible impregnating material, forming the mixture into the shape of the desired articles and applying sufficient heat to fuse the said impregnating material.

14. The method of preparing impregnated articles that comprises mixing a dry, fusible impregnating material with a dry cement that is adapted to harden in the presence of water, wetting the mixture, forming the mixture into the shape of the desired articles, and applying sufficient heat to fuse the said impregnating material.

15. The method of preparing impregnated articles that comprises mixing a dry, fusible impregnating material with a dry cement that is adapted to harden in the presence of water, wetting the mixture, forming the mixture into the shape of the desired articles, and applying sufficient heat, after the cement has set, to fuse the said impregnating material.

16. The method of preparing impregnated articles that comprises mixing fusible, resinous material, in dry, powdered form, with dry Portland cement, wetting the mixture sufficiently to produce a mixture of proper molding consistency, molding the mixture into the shape of the desired articles, and applying sufficient heat, after the cement has set, to fuse the said resinous material.

In testimony whereof, I have hereunto subscribed my name this 31st day of May 1917.

CHARLES E. SKINNER.